(12) United States Patent
Xu

(10) Patent No.: US 10,280,022 B2
(45) Date of Patent: May 7, 2019

(54) IMAGE READING APPARATUS AND IMAGE FORMING SYSTEM

(71) Applicant: KONICA MINOLTA, INC., Chiyoda-ku, Tokyo (JP)

(72) Inventor: Tianzi Xu, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/803,146

(22) Filed: Nov. 3, 2017

(65) Prior Publication Data
US 2018/0139339 A1    May 17, 2018

(30) Foreign Application Priority Data

Nov. 14, 2016 (JP) .................. 2016-221151
Nov. 14, 2016 (JP) .................. 2016-221153

(51) Int. Cl.
B65H 7/20    (2006.01)
H04N 1/00    (2006.01)
G03G 15/00   (2006.01)

(52) U.S. Cl.
CPC ............. *B65H 7/20* (2013.01); *H04N 1/0009* (2013.01); *H04N 1/00652* (2013.01); *H04N 1/00761* (2013.01); *H04N 1/00793* (2013.01); *B65H 2513/10* (2013.01); *B65H 2513/102* (2013.01); *B65H 2513/106* (2013.01); *G03G 15/6529* (2013.01)

(58) Field of Classification Search
CPC .................. B65H 7/20; B65H 2513/10; B65H 2513/102; B65H 2513/106; H04N 1/00652; H04N 1/0009; H04N 1/00761; H04N 1/00793; H04N 1/00013; H04N 1/00018; H04N 1/00082; H04N 1/00806; G03G 15/6529; G03G 15/602

See application file for complete search history.

(56) References Cited

U.S. PATENT DOCUMENTS

2008/0304850 A1* 12/2008 Groningen ............. B41J 29/393
                                                          399/88
2013/0077137 A1*  3/2013 Nishikawa ......... H04N 1/00588
                                                          358/498

(Continued)

FOREIGN PATENT DOCUMENTS

JP    2012-019309 A    1/2012
JP    2012-182662 A    9/2012

(Continued)

*Primary Examiner* — David H Bollinger
(74) *Attorney, Agent, or Firm* — Buchanan Ingersoll & Rooney PC

(57) ABSTRACT

An image reading apparatus includes the following. A conveyor conveys a sheet on which an image is formed by an image forming apparatus. An image reader reads the image formed on the sheet. A storage stores a speed variation profile which shows a speed variation for conveying the sheet with the conveyor when the image is read by the image reader. A controller, based on a speed variation profile stored in the storage, controls the conveyor to cancel a variation in speed shown by the speed variation profile, controls the image reader to read a reference mark formed on a sheet by the image forming apparatus, and obtains a forming position of the reference mark.

24 Claims, 14 Drawing Sheets

(56) References Cited

U.S. PATENT DOCUMENTS

2013/0094888 A1* 4/2013 Maeshima ......... G03G 15/6564
399/388
2015/0156356 A1* 6/2015 Chang ................ H04N 1/00652
358/486

FOREIGN PATENT DOCUMENTS

JP        2013-074431 A    4/2013
JP        2016-180857 A    10/2016

* cited by examiner

| SPEED VARIATION CYCLE [mm] | SHEET TYPE | | |
|---|---|---|---|
| | STIFFNESS 600 A3 | STIFFNESS 1000 A3 | STIFFNESS 1200 A3 |
| CONVEYING SPEED [mm/s] 490 | 3.4 | 3.1 | 3.1 |
| 1000 | 4.7 | 3.8 | 2.7 |

81

IMAGE READING APPARATUS AND IMAGE FORMING SYSTEM

BACKGROUND

1. Technological Field

The present invention relates to an image reading apparatus and an image forming system.

2. Description of the Related Art

Conventional image forming apparatuses such as a copier or a printer, an image reading apparatus which reads an image on a sheet after image forming are used to adjust the color, position, magnitude, etc. of the image or to check whether the image is suitable. The image reading apparatus is positioned downstream of the image forming apparatus main body and a scanner which reads the image formed on one surface or both surfaces of the sheet is provided in the sheet conveying path. The information read by the image reading apparatus is fed back to the image forming apparatus.

In order to correct the color information read by the scanner to correct color information, a colorimeter which can measure the color information with high accuracy is also provided in the sheet conveying path.

In image forming apparatuses which form an image on both surfaces of the sheet, before the image to be printed is output, the images formed by the image forming apparatus main body on both surfaces of the sheet are read by the scanner and the read image information is fed back to the image forming apparatus main body to position the images on the front and the back of the sheet.

The positioning of the front and back images is performed by using a reference mark of the front and back images read by the scanner and the distance between the edges of the sheet. Both sides of the sheet are read by the scanner, the positions of the reference marks on the front surface and the back surface are detected by the read image, and the positions are corrected so as to be a preset position from the edge of the sheet. With this, the image positioning is performed.

In the image reading apparatus which reads the document while conveying the document, in order to solve the problem of expansion and contraction of the image which may occur in the separate sheet feeding mode, the non-separate sheet feeding mode, the U-turn path sheet ejection, and the straight path sheet ejection, there is a technique to change the image reading condition of the document according to the specified conveying mode (See Japanese Patent Application Laid-Open Publication No. 2012-182662).

In order to prevent unnecessary lines remaining on the sheet after cutting, there is an image processing apparatus which forms the reference mark toward the edge of the sheet than the position where the sheet is cut (See Japanese Patent Application Laid-Open Publication No. 2012-019309).

However, when the sheet is conveyed on the conveying path the speed of conveying the sheet varies by not only the difference in the sheet conveying speed according to conveying mode but also by the conveying roller which holds the sheet and the sheet shaking due to shock provided to the front end or the rear end of the sheet. Due to the change in the sheet conveying speed when the image is read, the reading position is displaced in the sheet conveying direction. When there is a difference in the position where the reference mark is actually formed on the sheet and the position of the reference mark read by the scanner, an accurate reading result cannot be obtained, and the image positioning cannot be performed correctly in the image forming apparatus.

SUMMARY

An object of the present invention, which has been made in view of these problems described above, is to accurately read the position of the reference mark formed on the sheet. Another object of the present invention is to calculate the correct image position even if the reading position is displaced by the change in the speed of conveying the sheet when the image is read.

To achieve at least one of the abovementioned objects, according to an aspect of the present invention, there is provided an image reading apparatus including: a conveyor which conveys a sheet on which an image is formed by an image forming apparatus; an image reader which reads the image formed on the sheet; a storage which stores a speed variation profile which shows a speed variation for conveying the sheet with the conveyor when the image is read by the image reader; and a controller which, based on a speed variation profile stored in the storage controls the conveyor to cancel a variation in speed shown by the speed variation profile, controls the image reader to read a reference mark formed on a sheet by the image forming apparatus, and obtains a forming position of the reference mark.

According to another aspect of the present invention, there is provided an image reading apparatus including: a conveyor which conveys a sheet on which an image is formed by an image forming apparatus; an image reader which reads the image formed on the sheet; a storage which stores a speed variation profile which shows a speed variation for conveying the sheet with the conveyor when the image is read by the image reader; and a controller which controls the conveyor to convey the sheet on which the reference mark is formed by the image forming apparatus while controlling the image reader to read the reference mark formed on the sheet, and calculates a forming position of the reference mark from a reading position of the reference mark obtained by the image reader based on the speed variation profile stored in the storage.

According to another aspect of the present invention, there is provided an image reading apparatus including: a conveyor which conveys a sheet on which an image is formed by an image forming apparatus; an image reader which reads the image formed on the sheet; a storage which stores a speed variation cycle for conveying the sheet with the conveyor when the image is read by the image reader; and a controller which controls the conveyor to convey one sheet on which a plurality of reference marks are formed by the image forming apparatus shifted ½ of the speed variation cycle stored in the storage in a sheet conveying direction for each mark while controlling the image reader to read the plurality of reference marks formed on the one sheet, and calculates forming positions of the plurality of reference marks based on reading positions of the plurality of reference marks obtained by the image reader.

According to another aspect of the present invention, there is provided an image reading apparatus including: a conveyor which conveys a sheet on which an image is formed by an image forming apparatus; an image reader which reads the image formed on the sheet; a storage which stores a speed variation cycle for conveying the sheet with the conveyor when the image is read by the image reader; and a controller which controls the conveyor to convey a plurality of sheets on which a reference mark is formed by the image forming apparatus on each sheet shifted ½ of the speed variation cycle stored in the storage in a sheet conveying direction for each mark while controlling the image reader to read the reference marks formed on the sheets, and calculates forming positions of the reference marks based on reading positions of the reference marks obtained by the image reader.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DESCRIPTION OF THE PREFERRED EMBODIMENTS

Hereinafter, one or more embodiments of the present invention will be described with reference to the drawings. However, the scope of the invention is not limited to the disclosed embodiments.

First Embodiment

A first embodiment of the image reading apparatus and the image forming system according to the present invention is described with reference to the drawings. The present invention is not limited to the illustrated examples.

Figure 1:
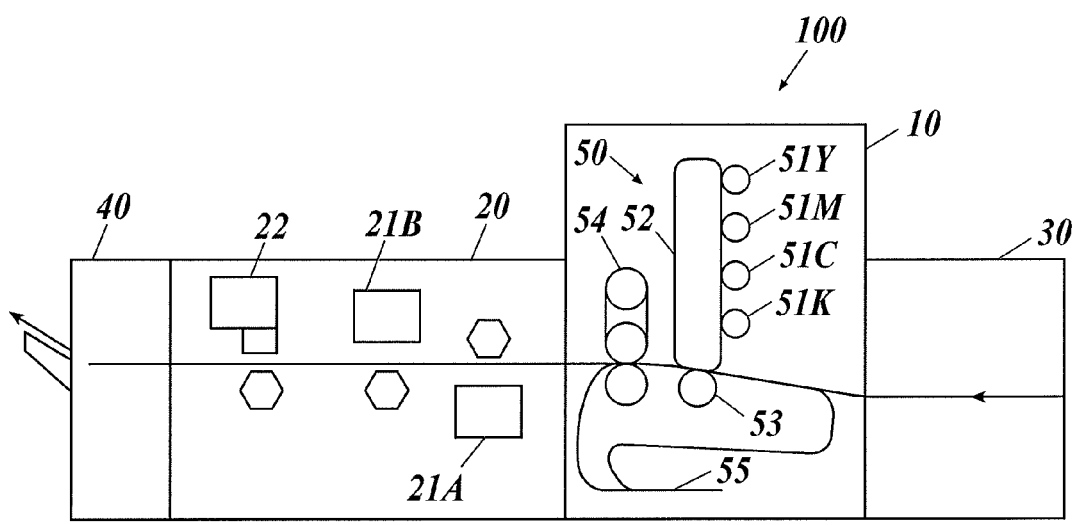
FIG. 1 is a schematic configuration of an image forming system according to a first embodiment of the present invention.

FIG. 1 shows a schematic configuration of an image forming system 100 according to the first embodiment.

As shown in FIG. 1, the image forming system 100 includes an image forming apparatus main body 10, an image reader 20, a sheet feeder 30, and a sheet ejector 40. After the image forming apparatus main body 10 forms an image on a sheet, the sheet is conveyed to the image reader 20.

The image forming apparatus main body 10 includes an image forming unit 50.

The image forming unit 50 forms an image on the sheet based on the image data.

The image forming unit 50 includes photoreceptor drums 51Y, 51M, 51C, 51K corresponding to each color of yellow (Y), magenta (M), cyan (C), and black (K), an intermediate transfer belt 52, a secondary transfer roller 53, a fixer 54, and an inverting mechanism 55.

After charging the entire photoreceptor drum 51Y, the photoreceptor drum 51Y is scanned and exposed with a laser beam based on the image data with the yellow color, and an electrostatic latent image is formed. Then, toner with the yellow color is attached to the electrostatic latent image on the photoreceptor drum 51Y and the image is developed.

With the exception of the used color, a process similar to the process performed on the photoreceptor drum 51Y is performed for the photoreceptor drums 51M, 51C, and 51K, and the description is omitted.

The toner images of each color formed on the photoreceptor drums 51Y, 51M, 51C, and 51K are sequentially transferred on a rotating intermediate transfer belt 52 (primary transfer). That is, a color toner image with the toner images of four colors overlapped on each other is formed on the intermediate transfer belt 52.

The color toner image on the intermediate transfer belt 52 is collectively transferred with the secondary transfer roller 53 onto the sheet supplied from the sheet feeder 30 (secondary transfer).

The fixer 54 includes a heating roller which heats the sheet on which the color toner image is transferred and a pressuring roller which applies pressure on the sheet. The fixer fixes the color toner image onto the sheet by applying heat and pressure.

The inverting mechanism 55 is a conveying path which turns over the sheet and supplies the sheet to the secondary transfer position again when the image is formed on both surfaces of the sheet.

The image reader 20 includes a first scanner 21A, a second scanner 21B, a spectrophotometer 22 and the like. The first scanner 21A, the second scanner 21B, and the spectrophotometer 22 are provided on the sheet conveying path downstream of the image forming apparatus main body 10 and are able to read the image forming surface of the sheet after image forming before the sheet is ejected outside.

The first scanner 21A and the second scanner 21B are orthogonal to the sheet conveying direction and include line sensors in which CCDs (Charge Coupled Device) are arranged in a line in the direction parallel to the sheet surface (sheet width direction). The first scanner 21A and the second scanner 21B are image readers which read the image formed on the conveyed sheet and output the obtained image data to the controller 11 (see FIG. 2).

When the first scanner 21A and the second scanner 21B are not discriminated below, the first scanner 21A and the second scanner 21B are collectively called the scanner 21.

The spectrophotometer 22 detects the spectral reflectance for each wavelength and measures the color of the image formed on the sheet. The spectrophotometer 22 recognizes the color information with high accuracy and uses the color information to correct the color information read by the first scanner 21A and the second scanner 21B.

The sheet feeder 30 includes a plurality of sheet feeding trays and supplies sheets to the image forming unit 50. Each sheet feeding tray stores a type of sheet determined in advance for each sheet feeding tray.

The sheet ejector 40 includes a sheet ejecting tray and ejects the sheet after image forming.

Figure 2:
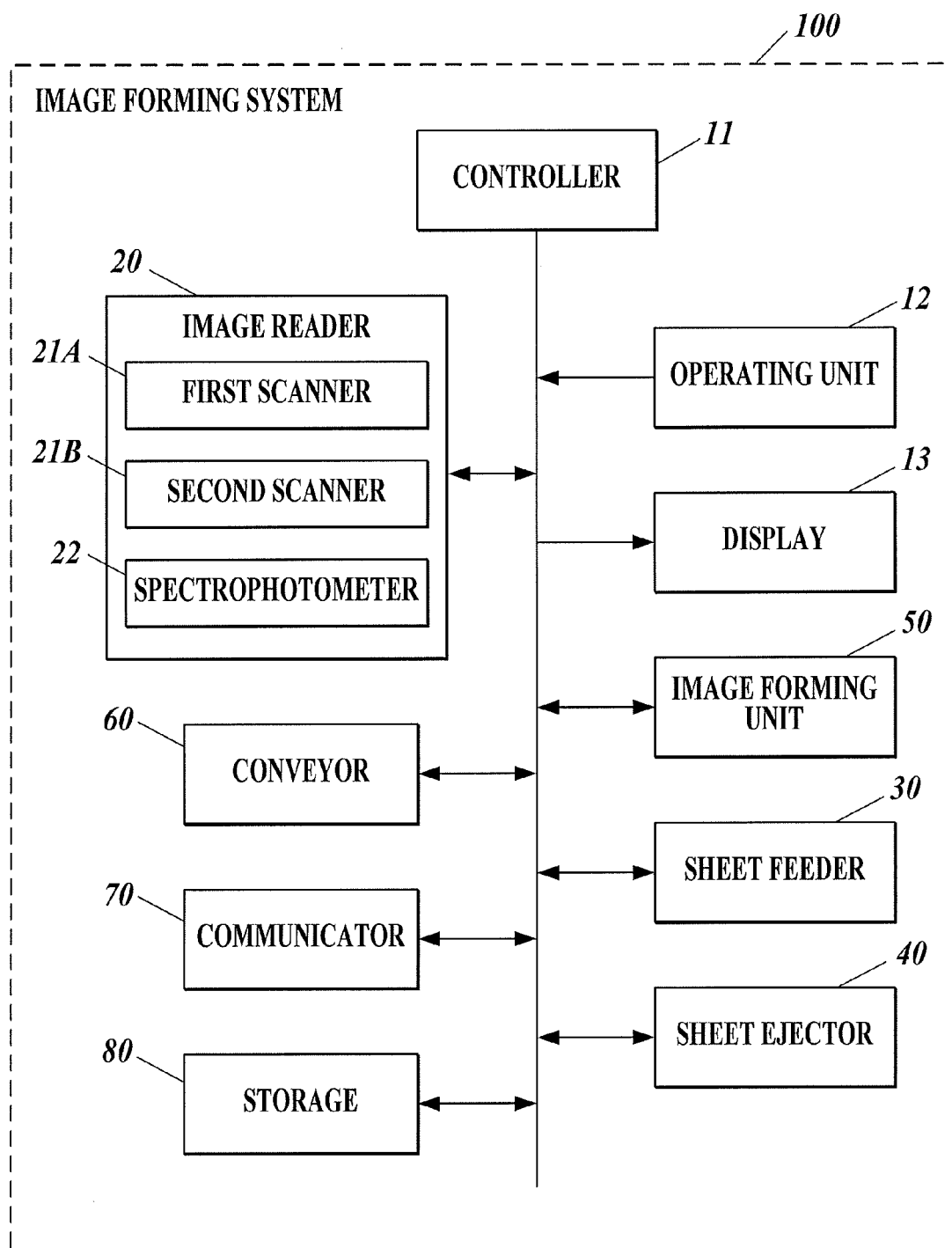
FIG. 2 is a block diagram showing a functional configuration of an image forming system.

FIG. 2 is a block diagram showing a functional configuration of an image forming system 100.

As shown in FIG. 2, the image forming system 100 includes a controller 11, an operating unit 12, a display 13, the image forming unit 50, the sheet feeder 30, the sheet ejector 40, the image reader 20, a conveyor 60, a communicator 70, a storage 80 and the like. The description of the functions which are already described is omitted.

The controller 11 includes a CPU (Central Processing Unit), a ROM (Read Only Memory), a RAM (Random Access Memory), and the like. The CPU reads out various processing programs stored in the ROM and deploys the program in the RAM. The CPU centrally controls the operation of each unit of the image forming system according to the deployed program.

The operating unit 12 includes a touch panel formed so as to cover the display screen of the display 13, and various operation buttons such as numeric buttons, start button and the like. The operating unit 12 outputs the operation signal according to operation by the user to the controller 11.

The display 13 includes an LCD (Liquid Crystal Display) and displays various screens according to an instruction of the display signal input from the controller 11.

The conveyor 60 includes a conveying roller for conveying the sheet and conveys the sheet in the image forming system 100. Specifically, the conveyor 60 conveys the sheet from the sheet feeder 30 to the image forming apparatus main body 10, conveys the sheet on which the image is formed by the image forming apparatus main body 10 in the image reader 20, and conveys the sheet from the image reader 20 to the sheet ejector 40.

The communicating unit 70 transmits and receives data between external devices connected to the communication network such as the LAN (Local Area Network), the internet, etc.

The storage 80 includes a hard disk, flash memory, and the like, and stores various data. The storage 80 stores a speed variation profile showing a variation in speed of conveying the sheet with the conveyor 60 when the image is read by the scanner 21 for each combination of the sheet type and the sheet conveying speed. The sheet type is classified according to basis weight, stiffness, thickness, size or a combination of the above.

The speed variation profile is information showing characteristics of the speed variation along the sheet conveying direction. The distance (positions of the sheet) from the front end of the sheet in the sheet conveying direction is corresponded to the speed when the certain location on the sheet passes the reading region of the scanner 21.

During the image reading, when the conveying roller (roller driver) holding the sheet and the sheet similarly shakes when shock is applied to the front end or the rear end of the sheet when the sheet is conveyed, the speed of conveying the sheet is changed. Such speed variation has high reproducibility and if the sheet type of the conveyed sheet and the conveying speed is constant, the same displacement of the reading position occurs in the sheet conveying direction every time.

The speed variation in image reading is cyclic along the sheet conveying direction.

The speed variation profile stored in the storage 80 has secure reproducibility and does not change according to status of use or environment.

When the target is the sheet on which the reference mark is formed by the image forming apparatus main body 10, based on the speed variation profile stored in the storage 80, the controller 11 reads the reference mark formed on the sheet with the scanner 21 while controlling the conveyor 60 so as to cancel the speed variation shown in the speed variation profile and obtains the position where the reference mark is formed.

Specifically, based on the speed variation profile stored in the storage 80, the controller 11 outputs the speed control signal which has a phase opposite of the speed variation shown in the speed variation profile to the driving roller of the conveyor 60 and corrects the reading speed for reading the reference mark with the scanner 21 to a goal value.

The reference mark is to be a mark used for positioning the image and is not limited to a cross shape.

Figure 3A:
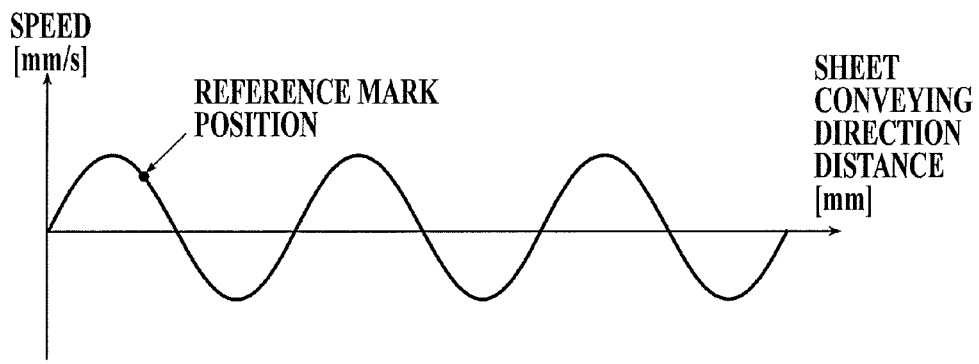
FIG. 3A is an example of a speed variation profile.
Figure 3B:
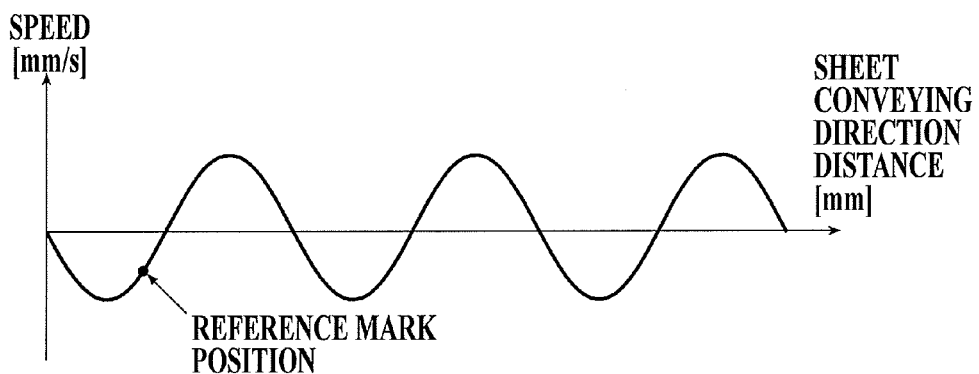
FIG. 3B is an example of controlling conveying speed when the image is read.
Figure 3C:
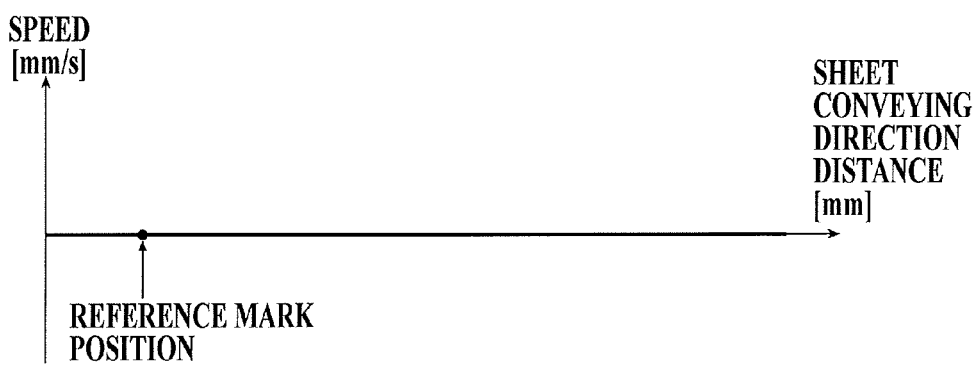
FIG. 3C is a result of controlling the conveying speed as shown in FIG. 3B when the sheet is conveyed while reading the image which is when speed variation characteristics can be seen as shown in FIG. 3A.

FIG. 3A is an example of a speed variation profile, and FIG. 3B is an example of conveying speed control for a conveyor 60 when the image is read. FIG. 3C is a result (image reading speed) of controlling the conveying speed as shown in FIG. 3B in conveying at image reading with speed variation characteristics as shown in FIG. 3A.

As shown in FIG. 3B, when the rotating speed of the driving roller of the conveyor 60 is controlled to be a phase opposite of the speed variation in sheet conveying at image reading, the speed variation of the sheet conveying in the image reading is canceled, and the image reading speed becomes closer to the goal value (certain value) in the sheet conveying direction as shown in FIG. 3C.

Since the starting point shown by the speed variation profile in the sheet conveying direction and the reading start timing of the front end of the sheet conveyed by the conveyor 60 needs to be matched, the reading start timing of the front end of the sheet can be accurately recognized with a sheet detecting sensor, etc.

When the speed variation profile for the combination of the sheet type and the conveying speed which the user desires to use is not stored in the storage 80, the controller 11 calculates the speed variation profile for such sheet type and conveying speed, and adds the result to the storage 80.

Figure 4:
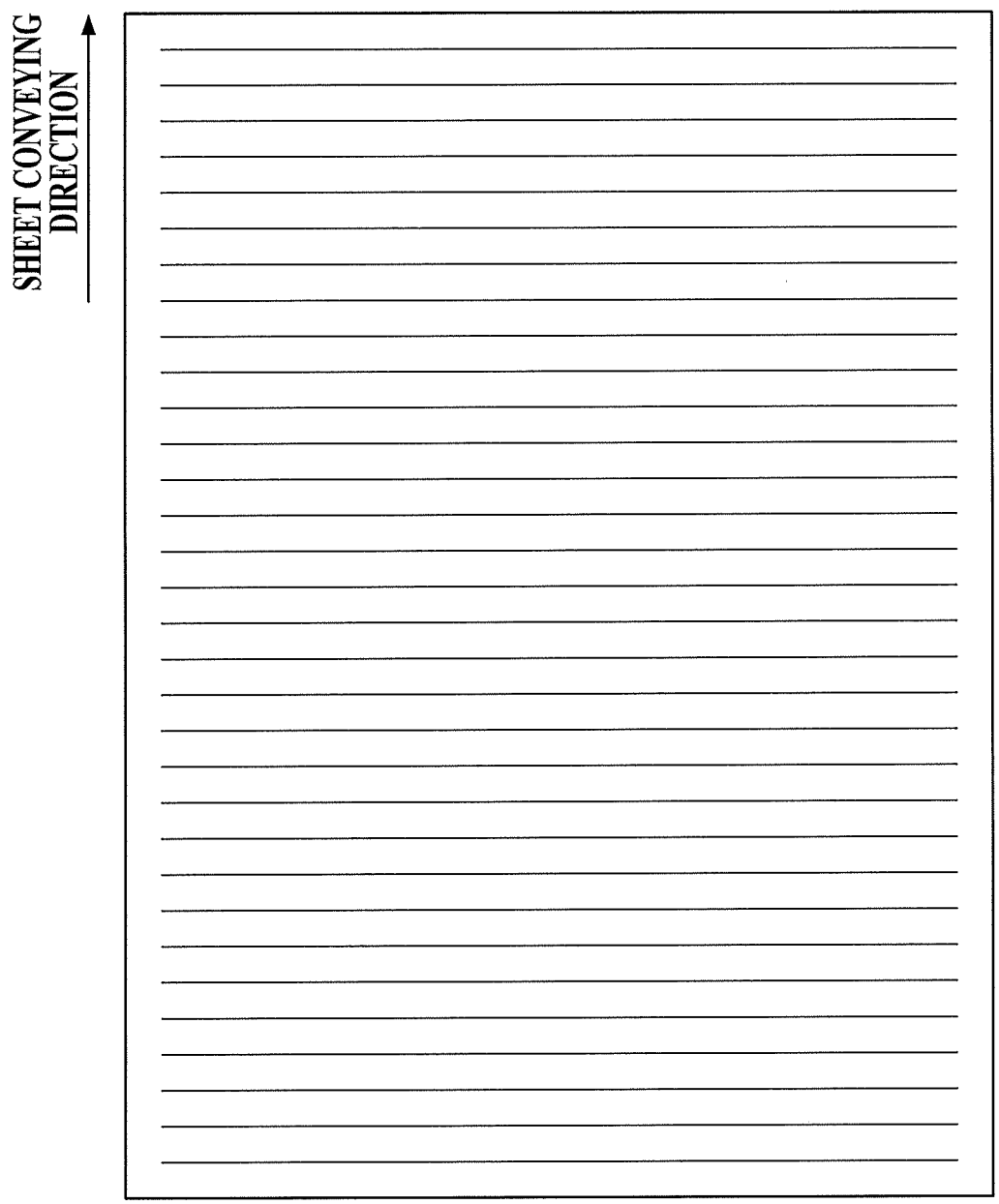
FIG. 4 is an example of a chart image.

When the new speed variation profile is obtained, the controller 11 controls the image forming unit 50 to form on the sheet an image (chart image) with a plurality of straight lines positioned at an equal interval in the sheet conveying direction. FIG. 4 shows an example of a chart image. The chart image may include straight lines with intervals of 0.254 mm and a thickness of 0.085 mm, but the chart image is not limited to the above. The chart image does not need to be formed on the entire sheet, and is to be formed at least on the region of the sheet where the user desires to obtain the speed variation profile.

The controller 11 uses the image forming apparatus main body 10 to form on the sheet the image with the plurality of straight lines positioned at an equal interval in the sheet conveying direction, and uses the conveyor 60 to convey the sheet while using the scanner 21 to read the image formed on the sheet. The controller 11 calculates the speed variation profile based on the read result of the plurality of straight lines obtained by the scanner 21 and stores the calculated speed variation profile in the storage 80.

The position displacement caused by the image forming apparatus main body 10 is considered not to occur when the chart image used for obtaining the speed variation profile is formed.

When there is a position displacement originally in the chart image formed by the image forming apparatus main body 10, an erroneous speed variation profile is calculated. The image forming position after correction which is adjusted (positioning) based on the reading position after correction obtained with the erroneous speed variation profile is to reliably have the accuracy demanded as the image forming position of the image forming apparatus main body 10.

The controller 11 positions the image formed with the image forming apparatus main body 10 based on the obtained forming position of the reference mark. That is, the controller 11 functions as the correction unit. The positioning of the image using the reference mark can be performed each time image forming is performed in the image forming system 100 or between image forming after every predetermined number of sheets.

Figure 5A:
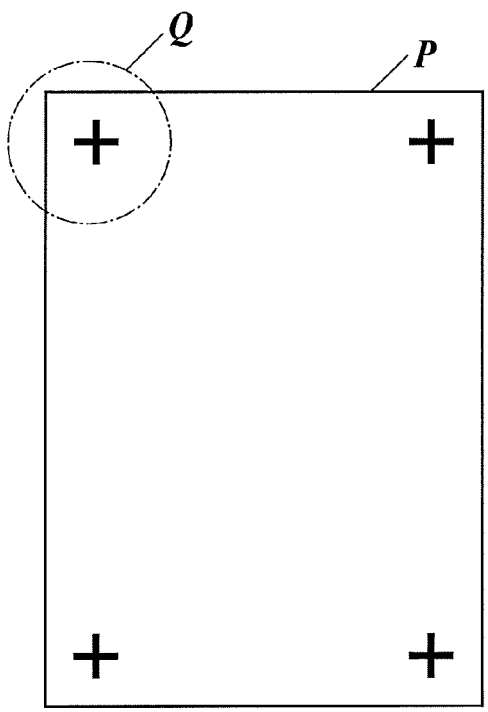
FIG. 5A is a diagram showing an example of a sheet in which reference marks are formed in four corners.
Figure 5B:
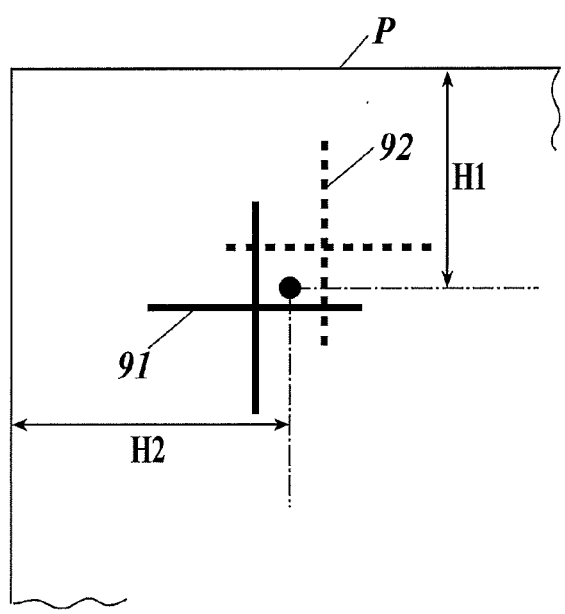
FIG. 5B is an enlarged diagram of a region in which the reference mark is formed.

FIG. 5A shows an example of the reference mark formed in four corners of the sheet P. FIG. 5B is an enlarged diagram of the region Q shown in FIG. 5A. The position of the reference mark 91 is adjusted so that the distance from the sheet edge to the reference mark 91 is a predetermined setting value H1 and H2 based on the position of the reference mark 91 formed on the front surface of the sheet P. The same is performed for the reference mark 92 formed on the rear surface of the sheet.

The controller 11, the scanner 21, the conveyor 60, and the storage 80 are included in the image reading apparatus according to the present invention.

Next, the operation of the image forming system 100 according to the first embodiment is described.

Figure 6:
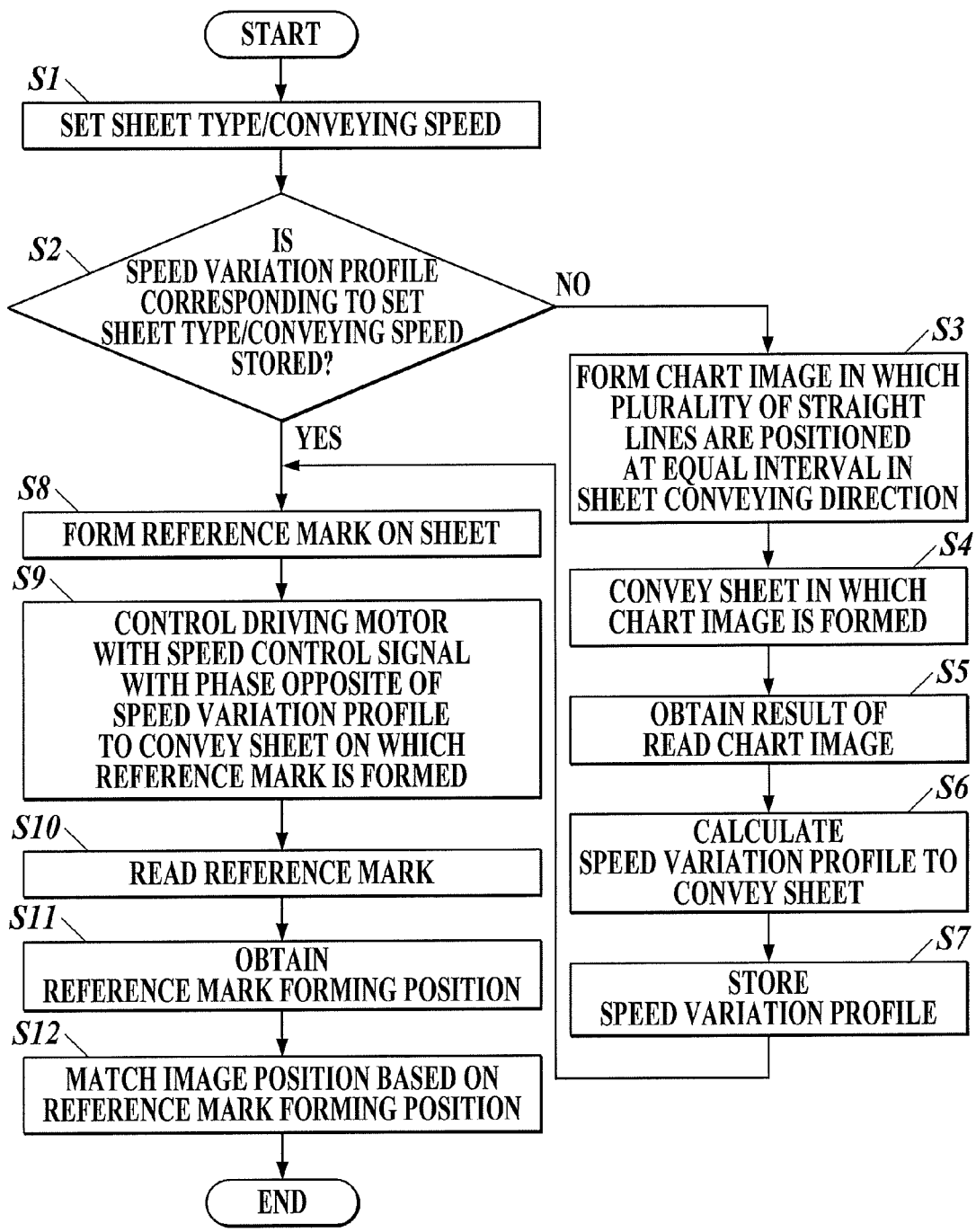
FIG. 6 is a flowchart showing a first image positioning process.

FIG. 6 is a flowchart showing a first image positioning process performed in the image forming system 100. Such process is performed with a software process by the CPU of the controller 11 in coordination with the program stored in the ROM.

First, when the user selects the sheet type of the sheet which is the image forming target and the conveying speed from the operating unit 12, the controller 11 performs setting according to the selected sheet type and conveying speed (step S1). When the conveying speed of the sheet is determined by the selection of the sheet type, the conveying speed does not have to be selected.

Next, the controller 11 determines whether the speed variation profile corresponding to the set sheet type and conveying speed is stored in the storage 80 (step S2).

When the speed variation profile corresponding to the set sheet type and conveying speed is not stored in the storage 80 (step S2; NO), the controller 11 controls the image forming unit 50 to form the chart image positioning the plurality of straight lines at an equal interval in the sheet conveying direction on the sheet with the set sheet type (step S3).

When the sheet on which the chart image is formed by the image forming unit 50 is conveyed to the image reader 20, while the controller 11 uses the conveyor 60 to convey the sheet on which the chart image is formed at the set conveying speed (step S4), the controller 11 uses the scanner 21 to read the chart image formed on the sheet to obtain the result (reading image data) of reading the chart image from the scanner 21 (step S5).

Next, the controller 11 calculates the speed variation profile based on the result of reading the plurality of straight lines obtained by the scanner 21 (step S6). Specifically, the controller 11 detects the position of the plurality of straight lines from the read image data and obtains the speed variation profile based on the displacement from the position where the straight lines should be.

Next, the controller 11 stores the calculated speed variation profile corresponded with the sheet type and the conveying speed in the storage 80 (step S7).

In step S2, when the speed variation profile corresponding to the set sheet type and conveying speed is stored in the storage 80 (step S2; YES), or after step S7, the controller 11 controls the image forming unit 50 to form the reference mark for positioning on the sheet with the set sheet type (step S8).

When the sheet on which the reference mark is formed by the image forming unit 50 is conveyed to the image reader 20, based on the speed variation profile stored in the storage 80 (speed variation profile corresponding to the sheet type and the conveying speed set in step S1), the controller 11 controls the driving motor of the conveyor 60 with the speed control signal with the phase opposite to the speed variation shown in the speed variation profile to convey the sheet on which the reference mark is formed (step S9) while using the scanner 21 to read the reference mark formed on the sheet and obtains the result (reading image data) of reading the reference mark from the scanner 21 (step S10).

Next, the controller 11 detects the position of the reference mark from the reading image data obtained by the scanner 21 and obtains the position as the forming position of the reference mark (step S11).

Next, the controller 11 positions the image formed in the image forming apparatus main body 10 based on the obtained forming position of the obtained reference mark (step S12). The result of positioning is applied to the image forming from hereinafter.

With this, the first image positioning process ends.

As described above, according to the first embodiment, when the image is read, the driving roller of the conveyor 60 is controlled with the speed control signal with the phase opposite of the speed variation shown in the speed variation profile, and the reading speed is corrected to the goal value. When the reading speed of the image becomes close to the goal value, the reading position displacement amount of the reference mark read by the scanner 21 decreases. Therefore, it is possible to accurately recognize the position of the reference mark formed on the sheet.

Since the forming position of the reference mark is accurately obtained and this is fed back to the image forming operation in the image forming apparatus main body 10, the positioning of the image can be performed accurately.

Since the speed variation profile is different for each sheet type and sheet conveying speed, by storing the speed variation profile for each sheet type and conveying speed, the forming position of the reference mark can be accurately obtained.

When the speed variation profile for the sheet type and conveying speed which is not stored in the storage 80 is used, the sheet on which the image with the plurality of straight lines positioned at equal intervals is formed in the sheet conveying direction is read and the speed variation profile can be calculated.

Second Embodiment

Next, the second embodiment of the present invention is described.

The image forming system according to the second embodiment has the same configuration as the image forming system 100 shown in the first embodiment. Therefore, FIG. 1 and FIG. 2 are to be referred and the illustration and the description in common with the image forming system 100 are omitted. The characteristic configuration and the process of the second embodiment are described.

The controller 11 uses the conveyor 60 to convey the sheet on which the reference mark is formed by the image forming apparatus main body 10, while using the scanner 21 to read the reference mark formed on the sheet, and calculates the forming position of the reference mark from the reading position of the reference mark obtained by the scanner 21 based on the speed variation profile stored in the storage 80.

Specifically, based on the speed variation profile, the controller 11 calculates the corresponding relation between the forming position of the image and the reading position. The controller 11 uses the conveyor 60 to convey the sheet on which the reference mark is formed with the conveying speed maintaining the state including the speed variation characteristics shown in the speed variation profile while using the scanner 21 to read the reference mark formed on the sheet, and calculates the forming position of the reference mark from the reading position of the reference mark based on the calculated corresponding relation.

Figure 7:
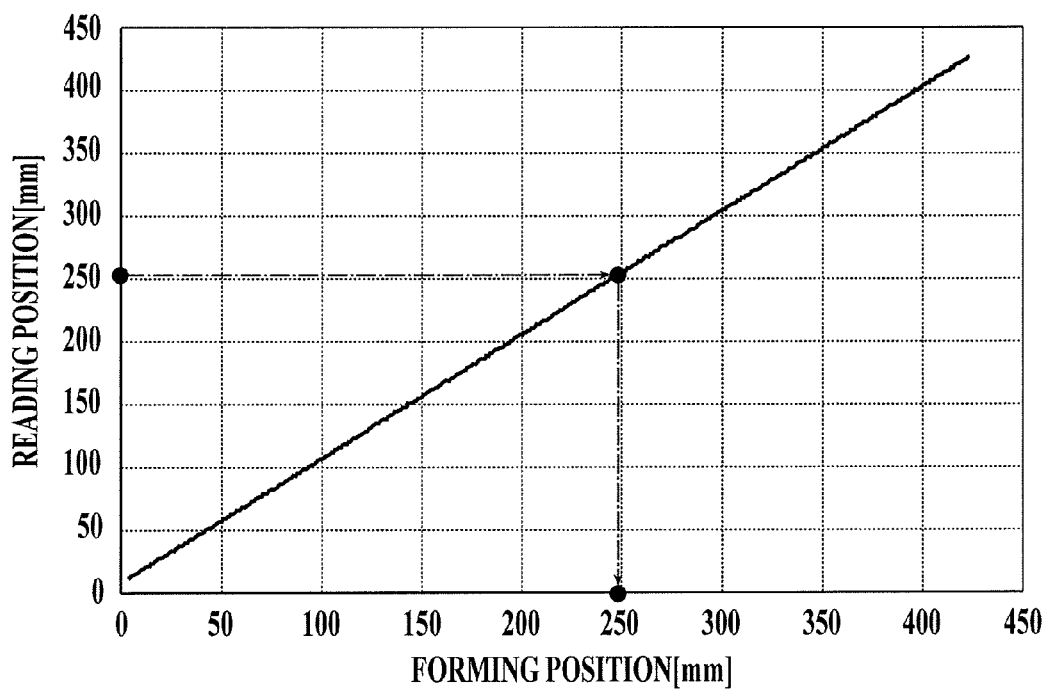
FIG. 7 is a diagram showing a corresponding relation between the forming position and the reading position of the image according to a second embodiment of the present invention.

FIG. 7 shows an example of the corresponding relation between the forming position of the image and the reading position obtained from the speed variation profile.

The controller 11 positions the image formed in the image forming apparatus main body 10 based on the calculated forming position of the reference mark.

Next, the operation of the image forming system according to the second embodiment is described.

Figure 8:
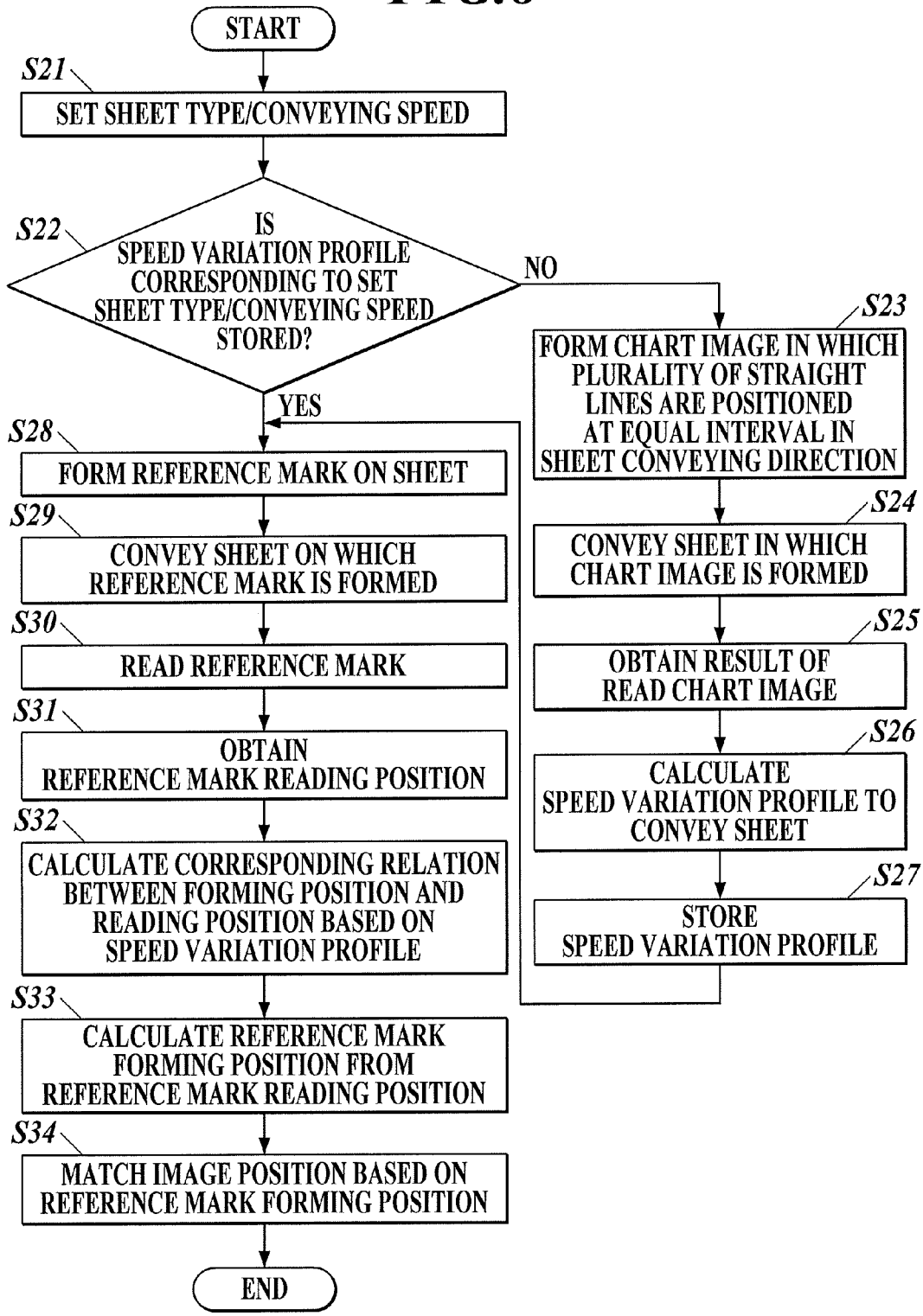
FIG. 8 is a flowchart showing a second image positioning process.

FIG. 8 is a flowchart showing a second image positioning process performed in the image forming system according to the second embodiment. Such process is performed with a software process by the CPU of the controller 11 in coordination with the program stored in the ROM.

The process of steps S21 to S28 is the same as the process of steps S1 to S8 of the first image positioning process (refer to FIG. 6) and the description is omitted.

After step S28, when the sheet on which the reference mark formed by the image forming unit 50 is conveyed to the image reader 20, the controller 11 uses the conveyor 60 to convey the sheet on which the reference mark is formed at the set conveying speed (step S29) while using the scanner 21 to read the reference mark formed on the sheet, and obtains the result (reading image data) of reading the reference mark from the scanner 21 (step S30).

The conveying speed control when the image is read as described in step S9 of the first positioning process is not performed in the second embodiment.

Next, the controller 11 obtains the reading position of the reference mark from the reading image data obtained by the scanner 21 (step S31).

Next, the controller 11 reads out the speed variation profile corresponding to the set sheet type and conveying speed from the storage 80, and calculates the corresponding relation between the forming position of the image and the reading position based on the speed variation profile (step S32). Specifically, the controller 11 calculates the reading position for each forming position in the sheet conveying direction from the speed for the distance from the sheet front end in the sheet conveying direction (positions on the sheet).

Next, based on the corresponding relation between the forming position and the reading position, the controller 11 calculates the forming position of the reference mark from the reading position of the reference mark (step S33).

Next, the controller 11 positions the image formed in the image forming apparatus main body 10 based on the calculated forming position of the reference mark (step S34). The result of the positioning is applied to the image forming from hereinafter.

With this, the second positioning process ends.

As described above, according to the second embodiment, the corresponding relation between the forming position of the image and the reading position in the scanner 21 can be calculated from the speed variation profile of the conveyed sheet. By using the corresponding relation, the forming position of the reference mark without the reading position displacement amount can be calculated from the reading position of the reference mark read by the scanner 21. Therefore, the position of the reference mark formed on the sheet can be accurately recognized.

Since the forming position of the reference mark is accurately calculated and is fed back to the image forming operation in the image forming apparatus main body 10, the image can be positioned accurately.

Further, since the speed variation profile is different for each sheet type and conveying speed of the sheet, by storing the speed variation profile for each sheet type and conveying speed, the forming position of the reference mark can be accurately calculated.

When the speed variation profile for the sheet type and conveying speed which is not stored in the storage 80 is used, the sheet on which the image in which the plurality of straight lines are positioned at an equal interval in the sheet conveying direction is read, and the speed variation profile can be calculated.

Third Embodiment

Next, the third embodiment of the present invention is described.

According to the third embodiment, the image forming systems with the same machine type are connected through a communication network and information is shared.

Figure 9:
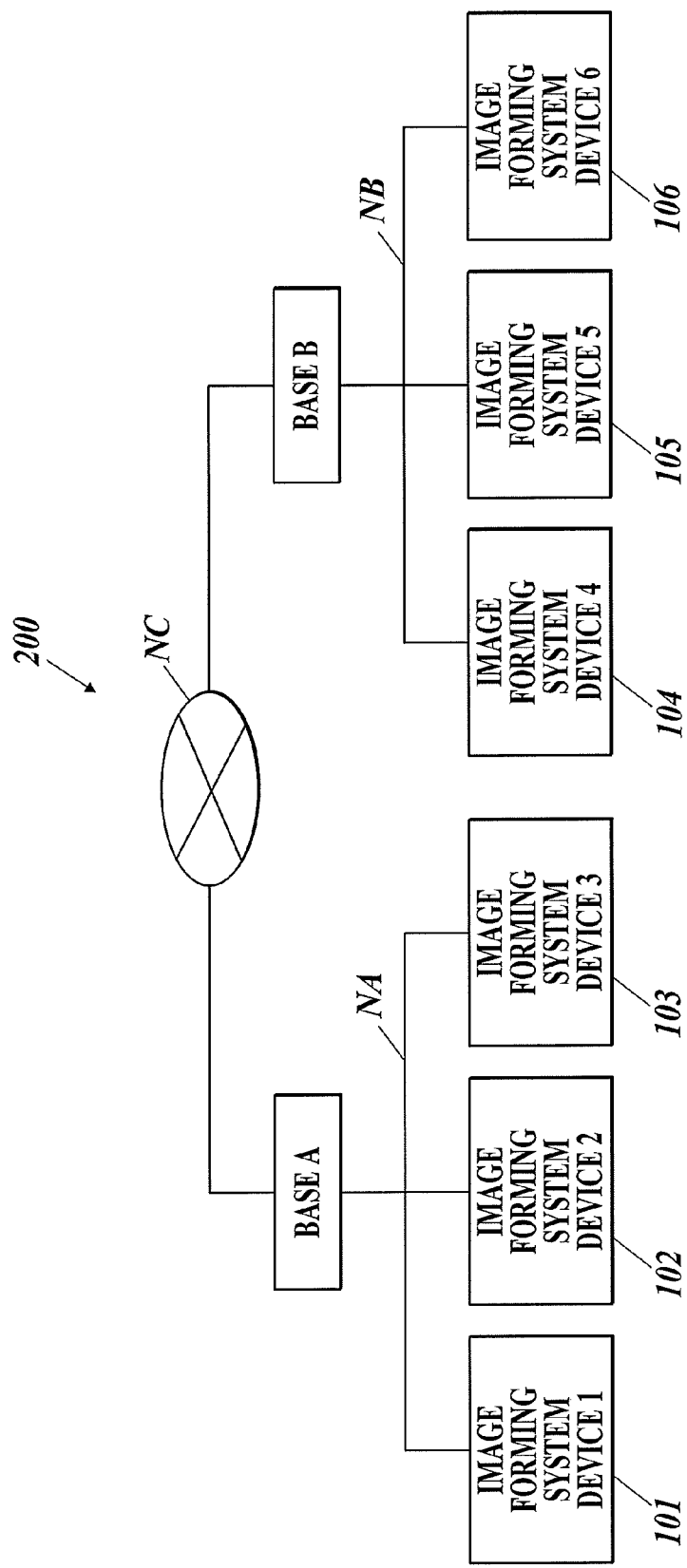
FIG. 9 is a diagram showing a configuration of an information sharing system according to a third embodiment of the present invention.

FIG. 9 shows a configuration of an information sharing system 200. The information sharing system 200 includes image forming systems 101 to 106. The image forming system 101 to 106 are devices 1 to 6 with the same type and same specs.

The image forming systems 101 to 103 are provided in base A and are connected to be able to communicate data among each other through an intracompany network NA.

The image forming systems 104 to 106 are provided in base B and are connected to be able to communicate data among each other through an intracompany network NB.

The base A and the base B are connected to each other through the internet NC, and the image forming systems 101 to 106 are able to communicate data with the image forming system provided in the different base.

The image forming systems 101 to 106 have the same configuration as the image forming system 100 shown in the first embodiment. Therefore, FIG. 1 and FIG. 2 are referred and the illustrations and the description in common with the image forming system 100 are omitted.

When the speed variation profile corresponding to the sheet type and the conveying speed which is not stored in the storage 80 is used, the controller 11 of the image forming system 101 performs the process in steps S1 to S7 of the first image positioning process (see FIG. 6), and the calculated speed variation profile is stored in the storage 80 corresponded with the sheet type and the conveying speed.

The controller 11 of the image forming system 101 uses the communicating unit 70 to transmit the newly obtained speed variation profile with the conditions regarding the sheet type and the conveying speed to the image forming systems 102 and 103 in the base A connected through the intracompany network NA. The controller 11 of the image forming systems 102 and 103 stores the speed variation profile received from the image forming system 101 in each of their own storage 80 corresponded with the sheet type and the conveying speed.

The controller 11 of the image forming system 101 uses the communicating unit 70 to transmit the newly obtained speed variation profile with the conditions regarding the sheet type and the conveying speed to the image forming systems 104 to 106 in the base B connected through the internet NC. The controller 11 of the image forming systems 104 to 106 stores the speed variation profile received from the image forming system 101 in each of their own storage 80 corresponded with the sheet type and the conveying speed.

As described above, the speed variation profile obtained by the image forming system 101 can be shared with other image forming systems 102 to 106 with the same machine type, and the image forming systems 102 to 106 can also use the newly obtained speed variation profile.

As described above, according to the third embodiment, since the speed variation profile is shared among other image forming systems with the same machine type connected through the intracompany networks NA or NB or the internet NC, the speed variation profile obtained in one image forming system can be used in another image forming system, and the position of the reference mark formed on the sheet can be accurately recognized.

The image forming systems 102 to 106 may receive the speed variation profile from the image forming system 101 in response to a user instruction from the image forming systems 102 to 106.

According to the third embodiment, instead of the image forming systems 101 to 106 controlling conveying speed such as canceling the speed variation when the image is read, the image forming systems 101 to 106 may calculate the forming position of the reference mark from the reading position of the reference mark obtained by the scanner 21 based on the speed variation profile as in the image forming system shown in the second embodiment.

Fourth Embodiment

Next, the fourth embodiment of the present invention is described.

The image forming system according to the fourth embodiment has the configuration similar to the image forming system 100 shown in the first embodiment. Therefore, FIG. 1 and FIG. 2 are referred and illustration and the description in common with the image forming system 100 are omitted. The characteristic configuration and process of the fourth embodiment are described.

The storage 80 stores a speed variation cycle of conveying the sheet with the conveyor 60 when the image is read by the scanner 21 for each combination of the sheet type and the sheet conveying speed. The sheet type is classified according to basis weight, stiffness, thickness, size or a combination of the above.

Figures 10, 11:
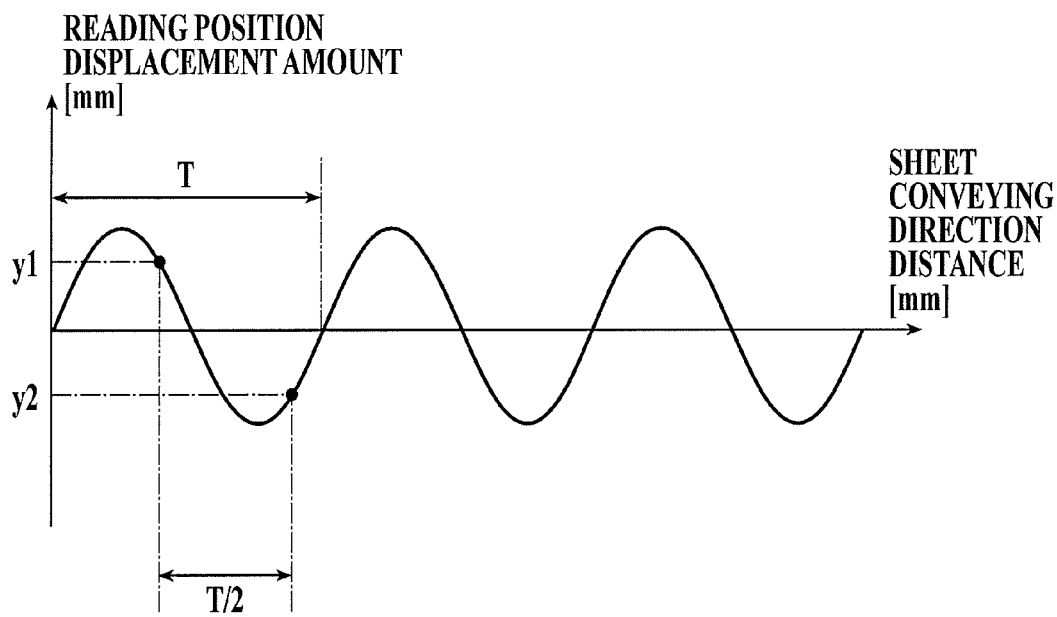
FIG. 10 is a diagram showing an example of a speed variation cycle table according to a fourth embodiment of the present invention.
FIG. 11 is a diagram showing a reading position displacement amount corresponding to a distance in the sheet conveying direction.

FIG. 10 shows an example of the speed variation cycle table 81 stored in the storage 80. The speed variation cycle table 81 stores the speed variation cycle for the combination of the sheet type (stiffness, size) and the sheet conveying speed.

The speed variation in reading the image is cyclic along the sheet conveying direction and the length of one shake in the sheet conveying direction is called a speed variation cycle.

FIG. 11 shows the reading position displacement amount corresponding to the distance (positions on the sheet) from the front end of the sheet in the sheet conveying direction when a sheet with a certain sheet type is conveyed at a certain conveying speed. Here, the reading position displacement amount is represented by a plus/minus value including the displacement direction (displacement toward the front end side of the sheet or displacement toward the rear end side of the sheet).

Since the speed variation cycle is different depending on the distance from the sheet front end in the sheet conveying direction, the speed variation cycle near the region where the reference mark is formed is used. The storage 80 stores the speed variation cycle near the region where the reference mark is formed.

The reference mark is a mark used for positioning the image and is not limited to a cross shape.

The speed variation cycle stored in the storage 80 has secure reproducibility and the variation due to use and environment is to be a predetermined amount or smaller.

Such predetermined amount is determined by the accuracy desired as the final image forming position. Preferably, the reading position displacement amount is ½ or less than the position displacement amount acceptable for the accuracy desired as the final image forming position.

The controller 11 reads the speed variation cycle stored in the storage 80 and controls the image forming unit 50 to form a plurality of reference marks on one sheet with a shift of ½ of the speed variation cycle in the sheet conveying direction for each reference mark.

Figure 12:
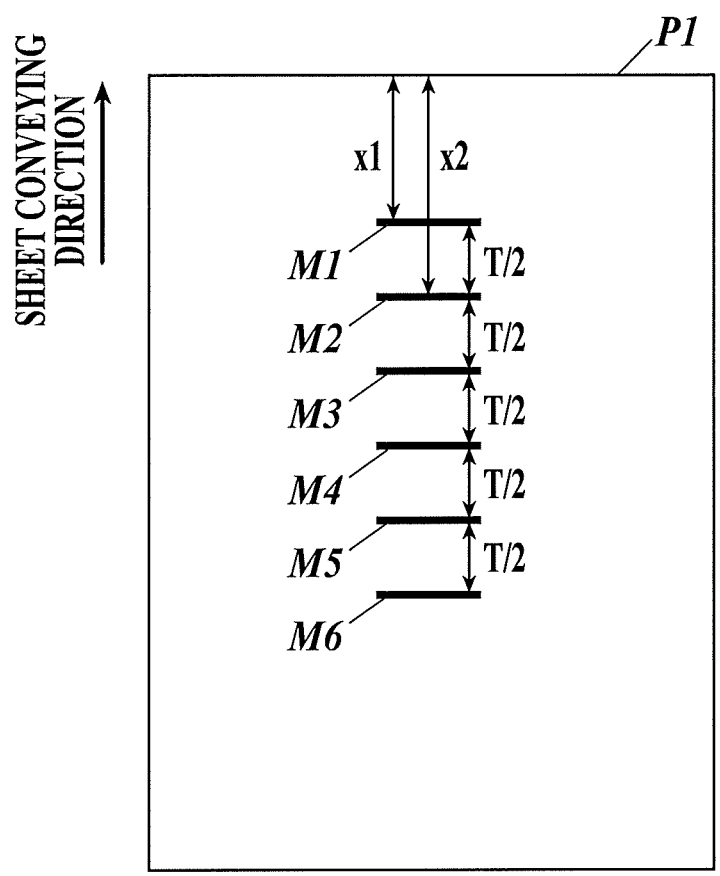
FIG. 12 is an example in which a plurality of reference marks are formed shifted in ½ the speed variation cycle in the sheet conveying direction on one sheet.

FIG. 12 is a diagram showing the reference marks M1 to M6 formed on the sheet P1 shifted ½ of the speed variation cycle in the sheet conveying direction for each mark.

The interval of the reference mark formed by the image forming apparatus main body 10 is ½ of the speed variation cycle. The position displacement in the distance between two reference marks due to the image forming apparatus main body 10 is to be a predetermined amount or smaller. Specifically, it is acceptable that there is a position displacement due to the image forming apparatus main body 10 in the distance from the sheet end to the first reference mark but it is not acceptable that there is a position displacement in the distance between the reference marks (equal to or less than the predetermined amount).

The predetermined amount is determined by the accuracy desired as the final image forming position. The image forming position after correction by adjustment (positioning) based on the reading position after correction calculated finally is to securely have the accuracy desired as the image forming position of the image forming apparatus main body 10.

The controller 11 uses the conveyor 60 to convey one sheet on which the plurality of reference marks are formed by the image forming apparatus main body 10 with the marks shifted ½ of the speed variation cycle stored in the storage 80 in the sheet conveying direction while using the scanner 21 to read the plurality of reference marks formed on the one sheet. Based on the reading position of the plurality of reference marks obtained by the scanner 21, the forming position of the plurality of reference marks (corrected reading position) is calculated.

When the speed variation cycle for the combination of the sheet type and the conveying speed desired to be used is not stored in the storage 80, the controller 11 calculates the speed variation cycle for the desired sheet type and conveying speed and adds the speed variation cycle to the storage 80.

When the new speed variation cycle is obtained, the controller 11 controls the image forming unit 50 to form an image (chart image) with a plurality of straight lines positioned at an equal interval in the sheet conveying direction (see FIG. 4). The chart image does not need to be formed on the entire sheet, and is to be formed at least on the region of the sheet where the user desires to obtain the speed variation cycle.

The controller 11 uses the conveyor 60 to convey the sheet on which the image with the plurality of straight lines positioned at an equal interval in the sheet conveying direction is formed by the image forming apparatus main body 10 while using the scanner 21 to read the image formed on the sheet. The controller 11 calculates the speed variation profile based on the read result of the plurality of straight lines obtained by the scanner 21 and stores the calculated speed variation cycle in the storage 80.

The position displacement caused by the image forming apparatus main body 10 is considered to be a predetermined amount or less when the chart image used for obtaining the speed variation cycle is formed.

When there is a position displacement originally in the chart image formed by the image forming apparatus main body 10, an erroneous speed variation cycle is calculated. The image forming position after correction which is adjusted (positioning) based on the reading position after correction calculated with the erroneous speed variation cycle is to reliably have the accuracy demanded as the image forming position of the image forming apparatus main body 10.

The controller 11 positions the image formed with the image forming apparatus main body 10 based on the calculated forming position of the reference mark (see FIG. 5A and FIG. 5B). That is, the controller 11 functions as the correction unit. The positioning of the image using the reference mark can be performed each time image forming is performed in the image forming system of the fourth embodiment or between image forming after every predetermined number of sheets.

Next, the operation of the image forming system according to the fourth embodiment is described.

Figure 13:
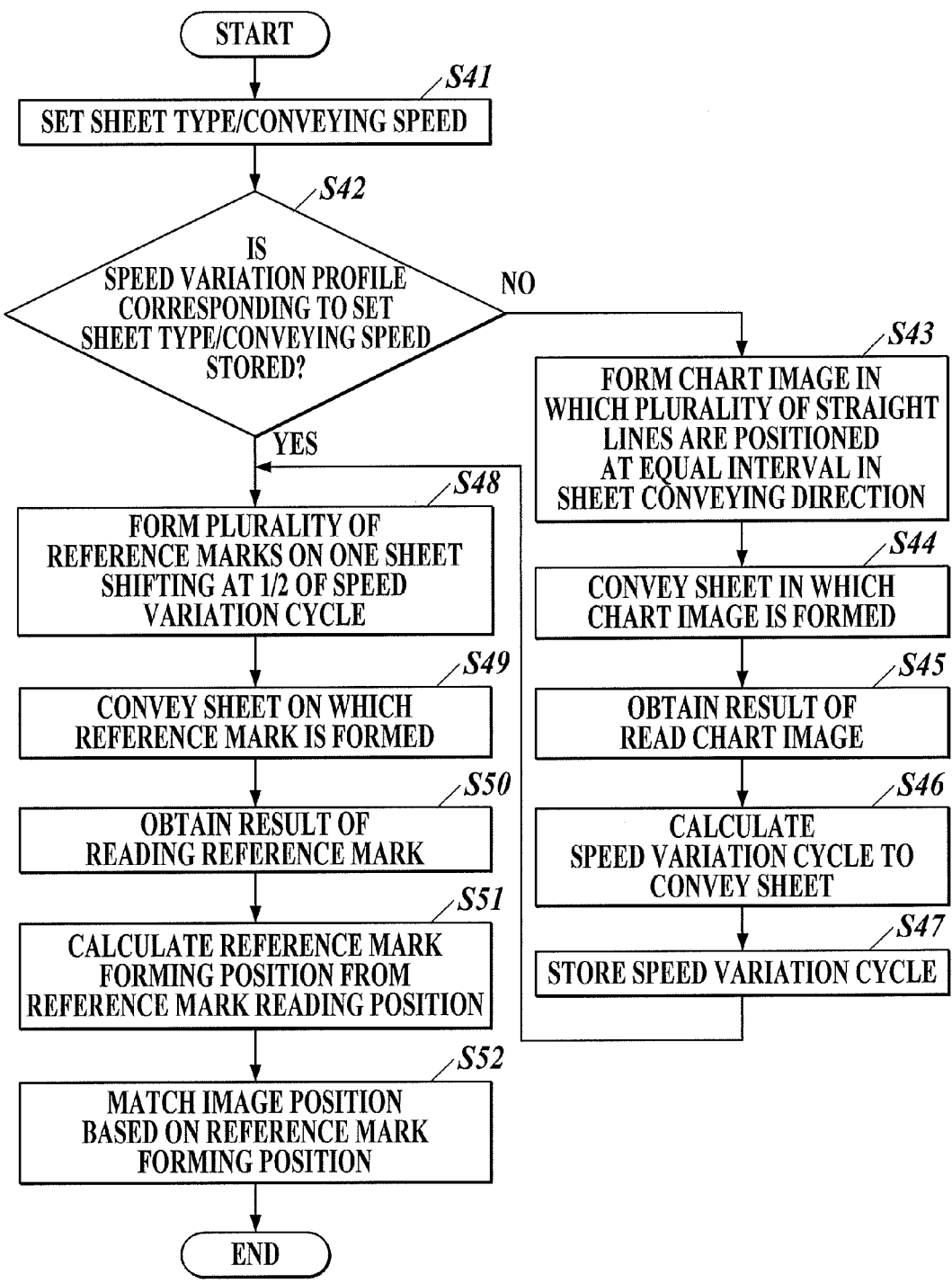
FIG. 13 is a flowchart showing a third image positioning process.

FIG. 13 is a flowchart showing a third image positioning process performed in the image forming system according to the fourth embodiment. Such process is performed with a software process by the CPU of the controller 11 in coordination with the program stored in the ROM.

First, when the user selects the sheet type of the sheet which is the image forming target and the conveying speed of the sheet from the operating unit 12, the controller 11 performs setting according to the selected sheet type and conveying speed (step S41). When the conveying speed of the sheet is determined by the selection of the sheet type, the conveying speed does not have to be selected.

Next, the controller 11 determines whether the speed variation cycle corresponding to the set sheet type and conveying speed is stored in the storage 80 (step S42).

When the speed variation cycle corresponding to the set sheet type and conveying speed is not stored in the storage 80 (step S42; NO), the controller 11 controls the image forming unit 50 to form the chart image positioning the plurality of straight lines at an equal interval in the sheet conveying direction on the sheet with the set sheet type (step S43).

When the sheet on which the chart image is formed by the image forming unit 50 is conveyed to the image reader 20, while conveying the sheet on which the chart image is formed with the conveyor 60 at the set conveying speed (step S44), the controller 11 uses the scanner 21 to read the chart image formed on the sheet to obtain the result (reading image data) of reading the chart image from the scanner 21 (step S45).

Next, the controller 11 calculates the speed variation cycle based on the result of reading the plurality of straight lines obtained by the scanner 21 (step S46). Specifically, the controller 11 detects the position of the plurality of straight lines of the reading image data and obtains the reading position displacement amount (see FIG. 11) in the sheet conveying direction or the speed variation. Then, the controller 11 calculates the length of one shake in the sheet conveying direction as the speed variation cycle with the reading position displacement amount or the speed variation.

Next, the controller 11 stores the calculated speed variation cycle in the storage 80 (step S47). Specifically, the controller 11 stores the calculated speed variation cycle corresponded with the sheet type and the conveying speed in the speed variation cycle table 81.

In step S42, when the speed variation cycle corresponding to the set sheet type and conveying speed is stored in the storage 80 (step S42; YES), or after step S47, the controller 11 reads the speed variation cycle corresponding to the set sheet type and conveying speed from the storage 80, and controls the image forming unit 50 to form on one sheet (sheet with set sheet type) a plurality of reference marks with a shift of ½ of the speed variation cycle in the sheet conveying direction for each mark (step S48).

When the sheet on which the plurality of reference marks are formed by the image forming unit 50 is conveyed to the image reader 20, the controller 11 uses the conveyor 60 to convey at the set conveying speed the one sheet on which the plurality of reference marks are formed shifted ½ of the speed variation cycle for each mark (step S49) while using the scanner 21 to read the plurality of reference marks formed on the one sheet and obtains the result (reading image data) of reading the plurality of reference marks from the scanner 21 (step S50).

Next, the controller 11 detects the reading position of the plurality of reference marks from the reading image data obtained by the scanner 21. The controller 11 calculates the forming position of the plurality of reference marks (corrected reading position) based on the reading position of the plurality of reference marks (step S51).

Next, the controller 11 positions the image formed in the image forming apparatus main body 10 based on the calculated forming position of the reference mark (step S52). The result of positioning is applied to the image forming from hereinafter.

With this, the third image positioning process ends.

Here, the correction method of the reading position obtained by the scanner 21 is described.

A plurality of reference marks are formed on one sheet with the position of the reference mark shifted ½ of the speed variation cycle for each mark. The forming position of the plurality of reference marks is to be x1, x2, x3 ... from the position closer to the sheet front end along the sheet conveying direction (see FIG. 12). When the speed variation cycle is T, this is expressed by the following equation.

$$x2=x1+T/2 \tag{1}$$

The reading position of the plurality of reference marks obtained by the scanner 21 is to be z1, z2, z3, ....

The reading position displacement amount of the plurality of reference marks read by the scanner 21 is to be y1, y2, y3, ....

As shown in FIG. 11, the reading position displacement amount for each position in the sheet conveying direction has a cycle, and the reading position displacement amount between two points shifted ½ cycle in the sheet conveying direction has the same size with the direction (plus/minus) opposite.

$$y1=-y2 \tag{2}$$

The reading position of the plurality of reference marks after correcting the reading position displacement amount is w1, w2, w3, ....

$$w1=z1-y1 \tag{3}$$

$$w2=z2-y2 \tag{4}$$

The reading positions w1, w2, w3, ... of the reference marks with the reading position displacement amount corrected is the same as the forming positions x1, x2, x3, ... of the reference mark.

$$w1=x1 \tag{5}$$

$$w2=x2 \tag{6}$$

From the equation (1)

$$\begin{aligned} x1 + x2 &= x1 + (x1 + T/2) \\ &= 2 \times x1 + T/2 \end{aligned} \tag{7}$$

From the equations (5), (6), (3), (4)

$$\begin{aligned} x1 + x2 &= w1 + w2 \\ &= (z1 - y1) + (z2 - y2) \end{aligned} \tag{8}$$

From the equations (8), (2)

$$x1+x2=z1+z2 \tag{9}$$

From the equations (7), (9)

$$x1+x2=2\times x1+T/2=z1+z2$$

Therefore, $$x1=(z1+z2-T/2)/2 \tag{10}$$

Similarly, x2, x3, ... are obtained.

Regardless of the reading position displacement amount y1, y2, y3, ..., the reference mark forming positions x1, x2, x3, ... can be directly calculated from the reference mark reading positions z1, z2, z3, ....

As described above, according to the fourth embodiment, since the intervals of the adjacent reference marks is ½ of the speed variation cycle in the sheet conveying direction, the reference mark forming position not including the reading position displacement amount can be calculated directly from the reference mark reading position. Therefore, even if there is a displacement in the reading position due to speed variation of conveying the sheet in the image reading, the correct image position can be calculated.

The forming position of the reference mark is calculated accurately and the result is fed back to the image forming operation in the image forming apparatus main body 10. Therefore, the image can be positioned accurately.

Since the speed variation cycle is different for each sheet type and sheet conveying speed, by storing the speed variation cycle for each sheet type and conveying speed, the forming position of the reference mark can be calculated accurately.

When the speed variation cycle for the sheet type and the conveying speed which is not stored in the storage 80 is used, the speed variation cycle can be calculated by reading the sheet on which the image positioning the plurality of straight lines at an equal interval in the sheet conveying direction is formed.

Since a plurality of reference marks are formed on one sheet, the correction time is short and sheets are not consumed. However, since there are many reference marks, the image region for the images other than the reference mark becomes small.

Fifth Embodiment

Next, the fifth embodiment of the present invention is described.

The image forming system according to the fifth embodiment has the same configuration as the image forming system of the fourth embodiment. Therefore, FIG. 1 and FIG. 2 are referred, and illustration and description in common with the image forming system according to the fourth embodiment are omitted. The characteristic configuration and process of the fifth embodiment are described below.

The controller 11 reads the speed variation cycle stored in the storage 80 and controls the image forming unit 50 to form the reference mark on a plurality of sheets shifted ½ of the speed variation cycle in the sheet conveying direction for each mark.

Figure 14:
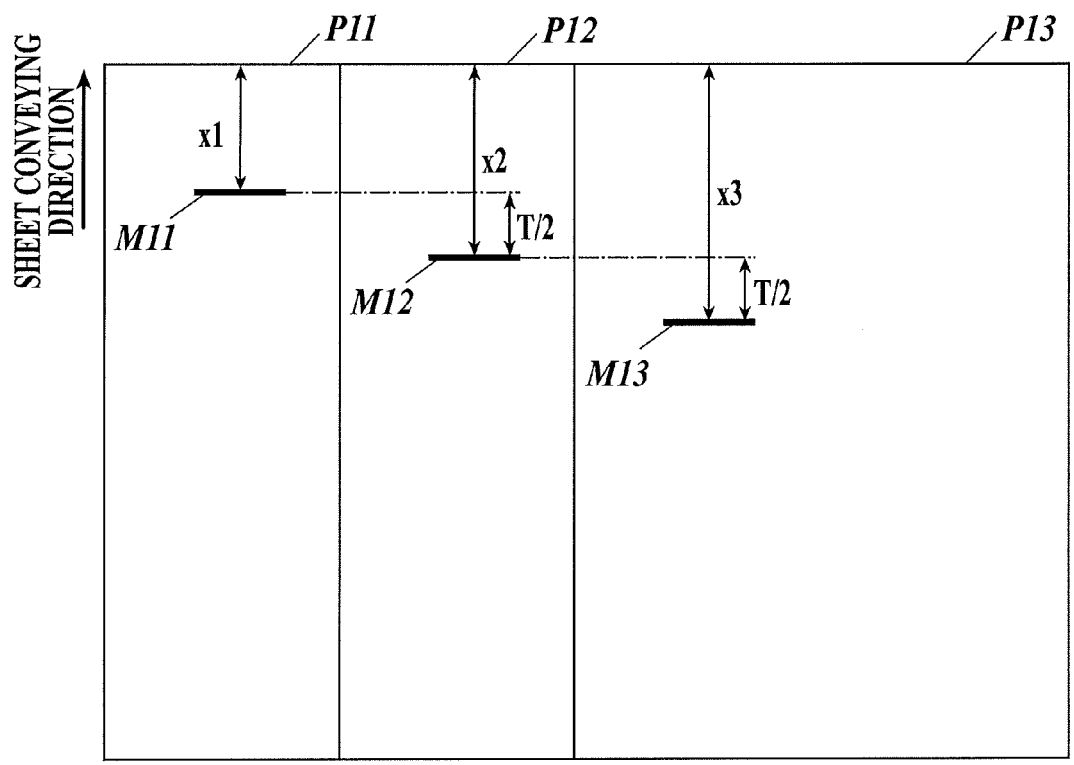
FIG. 14 is a diagram showing an example in which reference marks are formed shifted in ½ the speed variation cycle in the sheet conveying direction on a plurality of sheets according to a fifth embodiment of the present invention.

FIG. 14 shows an example in which reference marks M11, M12, M13 are formed on each of the sheets P11, P12, P13 with each of the reference marks shifted T/2 in the sheet conveying direction.

The controller 11 uses the conveyor 60 to convey the sheets on which the reference marks are formed by the image forming apparatus main body 10 on a plurality of sheets shifted ½ of the speed variation cycle store in the storage 80 in the sheet conveying direction while using the scanner 21 to read the reference marks formed on the sheets and calculates the reference mark forming position based on the reading position of each reference mark obtained by the scanner 21.

Next, the operation of the image forming system according to the fifth embodiment is described.

Figure 15:
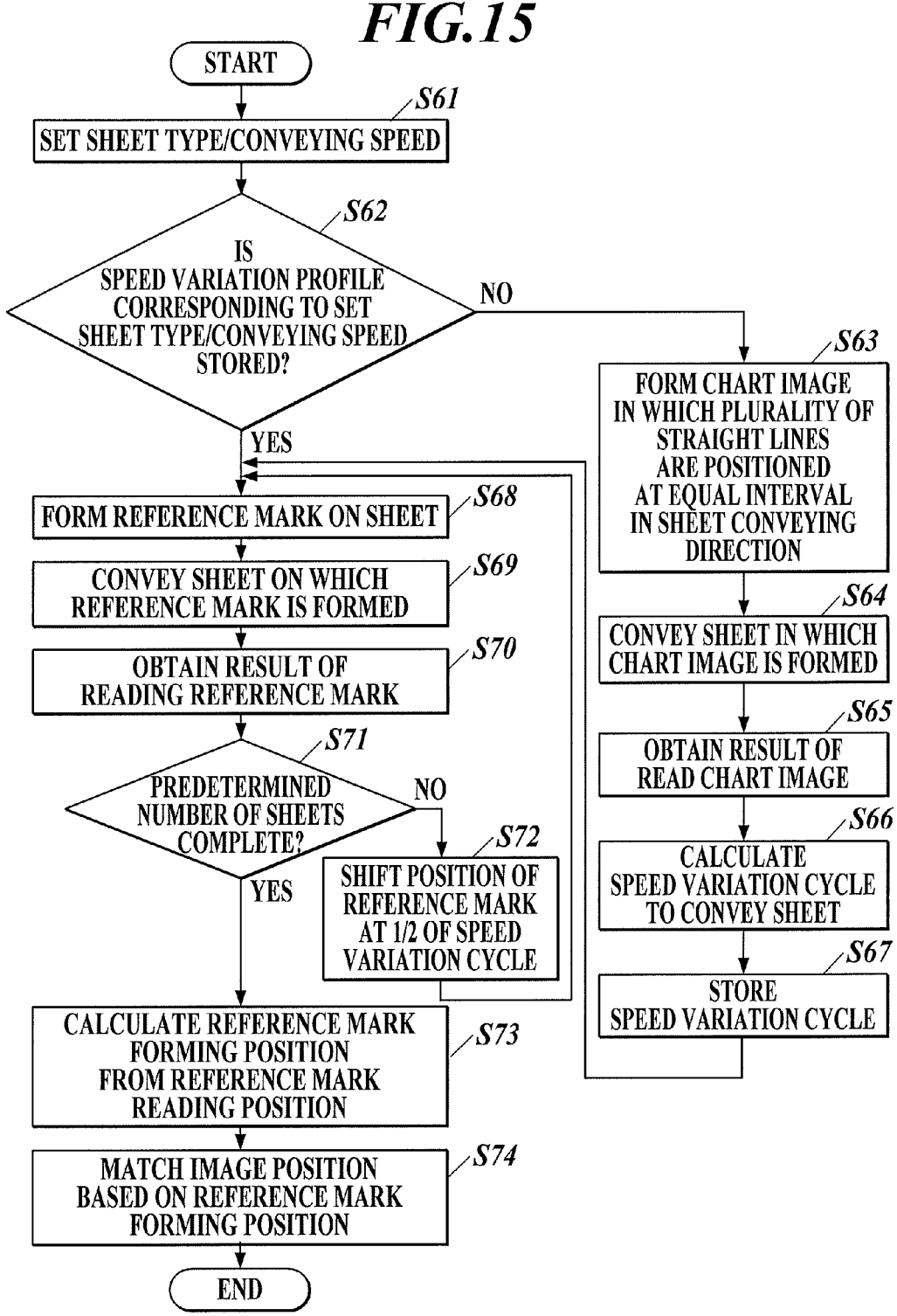
FIG. 15 is a flowchart showing a fourth image positioning process.

FIG. 15 is a flowchart showing the fourth image positioning process performed in the image forming system of the fifth embodiment. The process is performed with a software process by the CPU of the controller 11 in coordination with the program stored in the ROM.

The process of steps S61 to S67 is similar to the process of steps S41 to S47 of the third image positioning process (see FIG. 13), and the description is omitted.

In step S62, when the speed variation cycle corresponding to the set sheet type and the conveying speed is stored in the storage 80 (step S62; YES), or after step S67, the controller 11 reads the speed variation cycle corresponding to the set sheet type and conveying speed from the storage 80, and controls the image forming unit 50 to form one reference mark on one sheet (sheet of set sheet type) (step S68).

When the sheet on which the reference mark is formed by the image forming unit 50 is conveyed to the image reader 20, and the controller 11 uses the conveyor 60 to convey the sheet on which the reference mark is formed with the set conveying speed (step S69) while using the scanner 21 to read the reference mark formed on the sheet, and obtains the result (reading image data) of reading the reference mark from the scanner 21 (step S70).

Here, the controller 11 determines whether the forming and the reading of the reference mark for a predetermined number of sheets is finished (step S71).

When the forming and the reading of the reference mark for a predetermined number of sheets is not finished (step S71; NO), the controller 11 shifts the position of the next reference mark to be formed ½ of the speed variation cycle in the sheet conveying direction (step S72). Then, the process returns to step S68 and the process is repeated.

In step S71, when the forming and the reading of the reference marks for the predetermined number of sheets ends (step S71; YES), the controller 11 obtains the reading position of each reference mark from the reading image data for the plurality of sheets obtained by the scanner 21. The controller 11 calculates the forming position (corrected reading position) of the reference marks based on the reading position of the reference marks (step S73).

Next, based on the calculated reference mark forming position, the controller 11 positions the image formed in the image forming apparatus main body 10 (step S74). The result of positioning is applied to the image forming from hereinafter.

With this, the fourth image positioning process ends.

The fifth embodiment is different from the fourth embodiment in that the reference marks are formed on different sheets, but the method of calculating the forming position from the reading position of the reference marks is the same in both the fifth embodiment and the fourth embodiment.

For example, as shown in FIG. 14, the forming positions of the reference marks M11, M12, M13 for each of the sheets P11, P12, P13 are to be x1, x2, x3 from the position closer to the front end of the sheet along the sheet conveying direction, the reading positions of the reference marks M11, M12, M13 are to be z1, z2, z3, and the speed variation cycle is to be T. Similar to the above equation (10) the values can be obtained by the following.

$x1=(z1+z2-T/2)/2$ $x2=(z2+z3-T/2)/2$

As described above, according to the fifth embodiment, since the position of the reference marks formed on each one of the plurality of sheets is shifted ½ of the speed variation cycle in the sheet conveying direction, the forming position of the reference mark including the reading position displacement amount can be calculated directly from the reading position of the reference mark. Therefore, even if there is a displacement in the reading position due to the variation of speed when the sheet is conveyed in image reading, the correct image position can be calculated.

Further, since the forming position of the reference mark is calculated accurately and the result is fed back to the image forming operation in the image forming apparatus main body 10, the image can be positioned accurately.

Since the speed variation cycle is different for each sheet type and sheet conveying speed, by storing the speed variation cycle for each sheet type and conveying speed, it is possible to accurately calculate the forming position of the reference mark.

Further, when the speed variation cycle for the sheet type and the conveying speed which is not stored in the storage 80 is used, the speed variation cycle can be calculated by reading the sheet on which the image in which a plurality of straight lines are positioned at an equal interval in the sheet conveying direction is formed.

Since one reference mark is formed for each one of the plurality of sheets, the image region for the images other than the reference mark becomes larger. However, since many sheets are consumed, the correction time becomes longer, and a plurality of sheets become necessary.

Sixth Embodiment

Next, the sixth embodiment of the present invention is described.

According to the sixth embodiment, the image forming systems with the same machine type are connected through a communication network and information is shared.

The information sharing system of the sixth embodiment has the same configuration as the information sharing system 200 shown in the third embodiment. Therefore, FIG. 9 is referred, and illustration and description in common with the information sharing system 200 are omitted. The characteristic configuration and process of the sixth embodiment is described below.

The image forming systems 101 to 106 have the same configuration as the image forming system according to the fourth embodiment. Therefore, FIG. 1 and FIG. 2 are referred, and illustration and description in common with the image forming system of the fourth embodiment are omitted.

When the speed variation cycle corresponding to the sheet type and the conveying speed which is not stored in the storage 80 is used, the controller 11 of the image forming system 101 performs the process of steps S41 to S47 of the third image positioning process (see FIG. 13), and the calculated speed variation cycle is stored in the storage 80 corresponded with the sheet type and the conveying speed.

The controller 11 of the image forming system 101 uses the communicating unit 70 to transmit the newly obtained speed variation cycle with the conditions regarding the sheet type and the conveying speed to the image forming systems 102 and 103 in the base A connected through the intracompany network NA. The controller 11 of the image forming systems 102 and 103 store the speed variation cycle received from the image forming system 101 in each of their own storage 80 corresponded with the sheet type and the conveying speed.

The controller 11 of the image forming system 101 uses the communicating unit 70 to transmit the newly obtained speed variation cycle with the conditions regarding the sheet type and the conveying speed to the image forming systems 104 to 106 in the base B connected through the internet NC. The controller 11 of the image forming systems 104 to 106 store the speed variation cycle received from the image forming system 101 in each of their own storage 80 corresponded with the sheet type and the conveying speed.

As described above, the speed variation cycle obtained by the image forming system 101 can be shared with other image forming systems 102 to 106 with the same machine type, and the image forming systems 102 to 106 can also use the newly obtained speed variation cycle.

As described above, according to the sixth embodiment, since the speed variation cycle is shared among other image forming systems with the same machine type connected through the intracompany networks NA or NB or the internet NC, the speed variation cycle obtained in one image forming system can be used in another image forming system, and the correct image position can be calculated even if there is a displacement in the reading position due to the speed variation when the sheet is conveyed in the image reading.

The image forming systems 102 to 106 may receive the speed variation cycle from the image forming system 101 in response to a user instruction from the image forming systems 102 to 106.

According to the sixth embodiment, as in the image forming system shown in the fifth embodiment, one reference mark can be formed on each of the plurality of sheets and the forming position of each reference mark can be calculated.

The description of the above-described embodiments are examples of the image reading apparatus and the image forming system of the present invention, and the present invention is not limited to the above. The detailed configuration and operation of the apparatus or system can be suitably modified without leaving the scope of the present invention.

According to the above-described embodiments, the controller 11 of the image forming apparatus (image forming apparatus main body 10, etc.) also functions as the controlling unit of the image reading apparatus (scanner 21, conveying unit 60, etc.), but alternatively, the image forming apparatus and the image reading apparatus may have separate controlling units. In this case, the reference mark forming position (corrected reading position) can be obtained or calculated in the image reading apparatus and then transmitted to the image forming apparatus or the correction value for image forming can be calculated in the image reading apparatus and then transmitted to the image forming apparatus.

When the speed variation profile in the image reading is different between the first scanner 21A and the second scanner 21B, the speed variation profile can be managed separately, and the speed variation profile corresponding to the first scanner 21A or the second scanner 21B which reads the image can be used.

When the speed variation cycle in image reading is different between the first scanner 21A and the second scanner 21B, the speed variation cycle is managed separately and the speed variation cycle corresponding to the first scanner 21A or the second scanner 21B which reads the image can be used.

According to the present embodiment, an example including two scanners (first scanner 21A and second scanner 21B) which read the front surface/rear surface of the sheet in the image forming system is described, but the image reading apparatus may have only one scanner.

According to the image reading apparatus which includes one scanner and an inverting mechanism, after one side of the surface on which the image is formed is read, the inverting mechanism turns over the sheet and the other surface of the sheet is read.

Although embodiments of the present invention have been described and illustrated in detail, it is clearly understood that the same is by way of illustration and example only and not limitation, the scope of the present invention should be interpreted by terms of the appended claims.

Japanese Patent Application No. 2016-221151 and Japanese Patent Application No. 2016-221153 filed on Nov. 14, 2016 including description, claims, drawings, and abstract the entire disclosure is incorporated herein by reference in its entirety.

What is claimed is:

1. An image reading apparatus comprising:
   a conveyor which conveys a sheet on which an image is formed by an image forming apparatus;
   an image reader which reads the image formed on the sheet;
   a storage which stores a speed variation profile which shows a speed variation for conveying the sheet with the conveyor when the image is read by the image reader; and
   a controller which, based on a speed variation profile stored in the storage, controls the conveyor to correct a variation in speed shown by the speed variation profile by setting the conveyor speed based on the speed variation profile, controls the image reader to read a reference mark formed on a sheet by the image forming apparatus, and obtains a forming position of the reference mark from the image reader.

2. The image reading apparatus according to claim 1, wherein the speed variation profile is stored for each combination of a sheet type and a sheet conveying speed in the storage.

3. The image reading apparatus according to claim 2, wherein the sheet type is classified according to basis weight, stiffness, thickness, size or a combination of the above.

4. The image reading apparatus according to claim 1, wherein the controller controls the conveyor to convey the sheet on which an image in which a plurality of straight lines are positioned at an equal interval are formed in an image conveying direction by the image forming apparatus while controlling the image reader to read the image formed on the sheet, calculates the speed variation profile based on the reading result of the plurality of straight lines obtained by the image reader, and stores the calculated speed variation profile in the storage.

5. The image reading apparatus according to claim 1, further comprising a communicator which transmits and receives data between another image reading apparatus with a same machine type and connected through a communication network,
   wherein the controller shares the speed variation profile with the another image reading apparatus through the communicator.

6. An image forming system comprising:
   the image reading apparatus according to claim 1; and
   the image forming apparatus,
   wherein, the image forming apparatus includes a corrector which positions an image formed by the image forming apparatus based on the forming position of the reference mark.

7. An image reading apparatus comprising:
a conveyor which conveys a sheet on which an image is formed by an image forming apparatus;
an image reader which reads the image formed on the sheet;
a storage which stores a speed variation profile which shows a speed variation for conveying the sheet with the conveyor when the image is read by the image reader; and
a controller which controls the conveyor to convey the sheet on which the reference mark is formed by the image forming apparatus while controlling the image reader to read the reference mark formed on the sheet, and calculates a forming position of the reference mark from a reading position of the reference mark obtained by the image reader based on the speed variation profile stored in the storage.

8. The image reading apparatus according to claim 7, wherein the speed variation profile is stored for each combination of a sheet type and a sheet conveying speed in the storage.

9. The image reading apparatus according to claim 8, wherein the sheet type is classified according to basis weight, stiffness, thickness, size or a combination of the above.

10. The image reading apparatus according to claim 7, wherein the controller controls the conveyor to convey the sheet on which an image in which a plurality of straight lines are positioned at an equal interval are formed in an image conveying direction by the image forming apparatus while controlling the image reader to read the image formed on the sheet, calculates the speed variation profile based on the reading result of the plurality of straight lines obtained by the image reader, and stores the calculated speed variation profile in the storage.

11. The image reading apparatus according to claim 7, further comprising a communicator which transmits and receives data between another image reading apparatus with a same machine type and connected through a communication network,
wherein the controller shares the speed variation profile with the another image reading apparatus through the communicator.

12. An image forming system comprising:
the image reading apparatus according to claim 7; and
the image forming apparatus,
wherein, the image forming apparatus includes a corrector which positions an image formed by the image forming apparatus based on the forming position of the reference mark.

13. An image reading apparatus comprising:
a conveyor which conveys a sheet on which an image is formed by an image forming apparatus;
an image reader which reads the image formed on the sheet;
a storage which stores a speed variation cycle for conveying the sheet with the conveyor when the image is read by the image reader; and
a controller which controls the conveyor to convey one sheet on which a plurality of reference marks are formed by the image forming apparatus shifted ½ of the speed variation cycle stored in the storage in a sheet conveying direction for each mark while controlling the image reader to read the plurality of reference marks formed on the one sheet, and calculates forming positions of the plurality of reference marks based on reading positions of the plurality of reference marks obtained by the image reader.

14. The image reading apparatus according to claim 13, wherein the speed variation cycle is stored for each combination of a sheet type and a sheet conveying speed in the storage.

15. The image reading apparatus according to claim 14, wherein the sheet type is classified according to basis weight, stiffness, thickness, size or a combination of the above.

16. The image reading apparatus according to claim 13, wherein the controller controls the conveyor to convey the sheet on which an image in which a plurality of straight lines are positioned at an equal interval are formed in an image conveying direction by the image forming apparatus while controlling the image reader to read the image formed on the sheet, calculates the speed variation cycle based on the reading result of the plurality of straight lines obtained by the image reader, and stores the calculated speed variation cycle in the storage.

17. The image reading apparatus according to claim 13, further comprising a communicator which transmits and receives data between another image reading apparatus with a same machine type and connected through a communication network,
wherein the controller shares the speed variation profile with the another image reading apparatus through the communicator.

18. An image forming system comprising:
the image reading apparatus according to claim 13; and
the image forming apparatus,
wherein, the image forming apparatus includes a corrector which positions an image formed by the image forming apparatus based on the calculated forming position of the reference mark.

19. An image reading apparatus comprising:
a conveyor which conveys a sheet on which an image is formed by an image forming apparatus;
an image reader which reads the image formed on the sheet;
a storage which stores a speed variation cycle for conveying the sheet with the conveyor when the image is read by the image reader; and
a controller which controls the conveyor to convey a plurality of sheets on which a reference mark is formed by the image forming apparatus on each sheet shifted ½ of the speed variation cycle stored in the storage in a sheet conveying direction for each mark while controlling the image reader to read the reference marks formed on the sheets, and calculates forming positions of the reference marks based on reading positions of the reference marks obtained by the image reader.

20. The image reading apparatus according to claim 19, wherein the speed variation cycle is stored for each combination of a sheet type and a sheet conveying speed in the storage.

21. The image reading apparatus according to claim 20, wherein the sheet type is classified according to basis weight, stiffness, thickness, size or a combination of the above.

22. The image reading apparatus according to claim 19, wherein the controller controls the conveyor to convey the sheet on which an image in which a plurality of straight lines are positioned at an equal interval are formed in an image conveying direction by the image forming apparatus while controlling the image reader to read the image formed on the sheet, calculates the speed variation cycle based on the reading result of the plurality of straight lines obtained by the image reader, and stores the calculated speed variation cycle in the storage.

23. The image reading apparatus according to claim 19, further comprising a communicator which transmits and receives data between another image reading apparatus with a same machine type and connected through a communication network,
   wherein the controller shares the speed variation profile with the another image reading apparatus through the communicator.

24. An image forming system comprising:
   the image reading apparatus according to claim 19; and
   the image forming apparatus,
   wherein, the image forming apparatus includes a corrector which positions an image formed by the image forming apparatus based on the calculated forming position of the reference mark.

\* \* \* \* \*